United States Patent Office 2,720,450
Patented Oct. 11, 1955

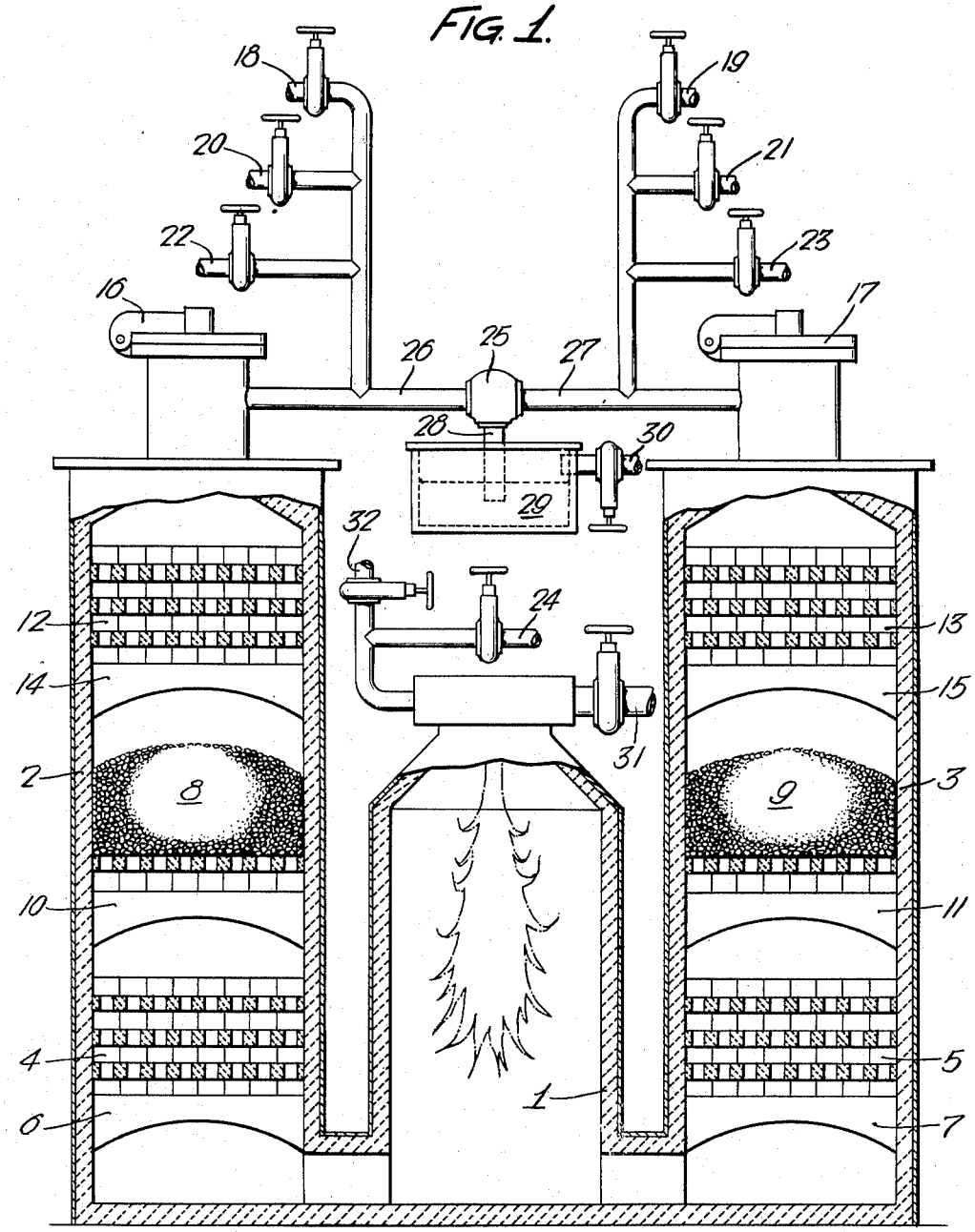

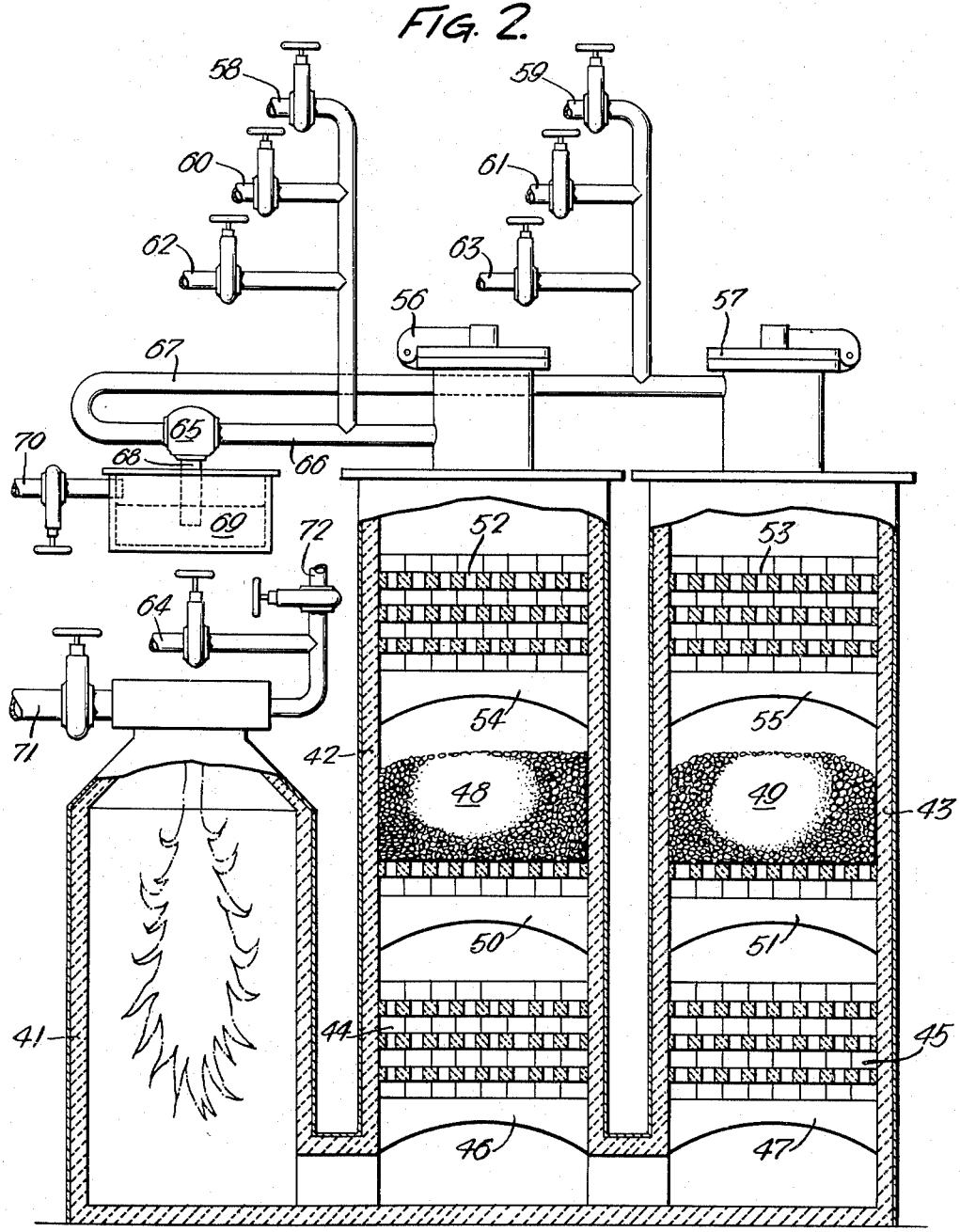

2,720,450

PROCESS AND APPARATUS FOR MANUFACTURING GAS RICH IN HYDROGEN

John S. Haug, Philadelphia, Pa., assignor, by mesne assignments, to The United Gas Improvement Company, Philadelphia, Pa., a corporation of Pennsylvania Application August 23, 1950, Serial No. 181,003

5 Claims. (Cl. 48—196)

The present invention relates to the production of a gas rich in hydrogen and oxides of carbon, mainly carbon monoxide. More particularly, it relates to a cyclic process comprising a reaction between a hydrocarbon in the gaseous state and steam, known as reforming, for the manufacture of a gas which is especially suitable, upon appropriate enrichment with a hydrocarbon gas, for distribution as a combustible gas in city gas mains, and can be made interchangeable with presently available manufactured gases distributed in city gas mains. The invention also relates to a novel apparatus in which the described process may be carried out.

Heretofore, the reforming of hydrocarbons has been accomplished for the most part by passing it through a coke fire, preferably with process steam admixed. In this way, thermal cracking occurs with the formation of hydrogen and carbon. Little or none of the carbon content of the hydrocarbon, however, is converted directly to carbon monoxide in the vapor phase, although some of the deposited carbon may be converted to carbon monoxide and hydrogen by reaction of the steam with the hot coke fire bed. Generally, however, the carbon which is deposited in the fuel bed is consumed when blasting the fire. On the other hand, the carbon which passes out with the gas clogs the gas mains and condensing apparatus and must be scrubbed from the gas by water sprays or precipitated electrically, at considerable added expense. Furthermore, such carbon is obviously lost to the gas-making process.

It is known that hydrocarbons in the gaseous state can be reacted with steam to liberate hydrogen and at the same time form carbon monoxide by union of the carbon of the hydrocarbon gas with the oxygen of the steam, and liberation of additional hydrogen from the steam, and catalysts have been employed to permit the reaction to take place at a temperature below that at which thermal cracking occurs, in order to avoid production of carbon as an end product.

The equipment hitherto used for catalytic conversion of the hydrocarbons with steam is very costly. It has mainly consisted of high alloy metal tubes or retorts filled with catalytic material heated externally in a furnace. The hydrocarbon gas and steam are passed through the catalytic material continuously with production of hydrogen, carbon monoxide, and small amounts of carbon dioxide. The process conducted in such equipment has certain disadvantages. Thus the temperature of the catalyst is maintained by conduction of the heat from the furnace, through the tubes, to supply the heat of formation of the product gas and its sensible heat. The conductivity of the catalytic material in discrete particle form is not high so that the metallic tubes or retorts, if the catalyst is held at a high temperature of, for example, from 1600° F.–1800° F., must operate at a temperature not very far below the maximum safe temperature of the most resistant metal alloy tubes and necessarily higher than the reaction temperature of the catalyst. Furthermore, since the conduction from particle to particle of the catalyst is poor, the temperature of the catalyst next to the tube or retort wall is higher than at the center, making a non-uniform temperature across the tube or retort. In addition, not only are the high alloy metal tubes expensive and subject to considerable maintenance costs but the multiplicity of tubes requires a multiplicity of valve connections and flow meters which in turn add to the expense of installation.

Because of these difficulties, inherent in a continuous, externally heated reforming system, various cyclic processes have been suggested. One such process involved the use of a catalyst bed which was alternately blasted with burning gases to store heat in the catalyst followed by passing the hydrocarbon and steam through the bed to effect conversion. However, by this method, in order to avoid destruction of the catalyst bed by excessive combustion temperatures, the quantity of heat stored in the catalyst bed was limited with the result that the incoming cooler steam and hydrocarbon gas, coupled with the high heat requirements of the reforming reaction itself rapidly cooled the catalyst to below reaction temperatures and caused wide rapid fluctuations in temperature. Also since the heat required for raising the reactants to reaction temperature and for the resulting endothermic reaction, was supplied by the heat stored in the catalyst bed, excessively large amounts of catalyst, a very expensive item, were required to provide enough heat storage. In addition, in many of these prior cyclic processes, relatively large amounts of carbon and other combustible materials were deposited on the catalyst which decreased its activity and clogged the gas passages through the catalyst bed.

A recent substantial improvement in cyclic catalytic processes for producing a gas rich in hydrogen and oxides of carbon, mainly carbon monoxide, is disclosed and claimed in copending application of John Hawley Taussig, Jr., Serial Number 124,648, now Patent No. 2,665,979. In accordance with the process there-disclosed, in one part of the cycle fluid fuel is burned in a combustion chamber and the hot products of combustion are passed through a zone containing heat storage material and then through a zone of catalyst, to store heat therein and to supply the heat required for the process. In the other part of the cycle, the reacting hydrocarbon gas mixed with steam, and, in the preferred embodiment with air, is conducted first through the zone containing heat storage material, which serves as a preheating zone, to preheat the mixture, and then through the zone containing the catalyst in which the reaction takes place, producing a clean gas in which the hydrogen of the reacting hydrocarbon has been liberated and the carbon thereof has been combined with the oxygen in the steam (and of the air if air is used) to form carbon monoxide and carbon dioxide. By this procedure, before the reactants are brought in contact with the catalyst they are blended and uniformly preheated in a preheating zone containing the heat storage material which in turn is heated by direct contact with the combustion gases in the heat storage portion of the cycle. When distributed, as city gas, if such use is desired, the gas produced during the reforming portion of the cycle will have had mixed therewith a predetermined portion of normally gaseous hydrocarbon in order to provide the desired calorific value. This process overcomes many disadvantages of the prior art procedures.

There are, however, several limitations on the above-described process. As indicated above, the entrance portion of the heat storage zone is adjacent the combustion zone so that the burning fuel, through radiation and direct contact, impart extremely high temperatures to the first portion of the preheating zone. Yet, since the incoming hydrocarbon and steam, and air, if used, employed during the reforming portion of the cycle contact this portion of the heat storage material, there is danger of thermally cracking initial portions of the hydrocarbon with the deleterious formation of carbon. This danger places a limitation on the vigor of combustion tolerated in the combustion zone, and yet due to the cooling effect of these incoming materials on this same portion of the heat storage zone, together with the overall heat requirements of the process, it is desirable not to have such a limitation. As a necessary corollary to this limitation is the difficulty due to faulty ignition of fuel during the heating steps because the cooling effect of the incoming reactants reduces the temperature of the combustion zone and initial portion of the heat storage zone to below ignition temperatures. There is thus presented the problem of maintaining sufficient temperature in the catalyst zone, while limiting temperature at the end of the heating step in order to provide operating temperatures which neither swing so high as to cause thermal cracking and so low as to prevent normal ignition of the fuel or to extinguish the burning fuel if already ignited. The fluctuating surface temperatures at the inlet to the preheat zone also cause spalling of the brickwork and supporting arches.

A further problem presents itself in maintaining the catalyst in a high state of activity. It is the metal (nickel, and the like, as discussed more in detail hereinafter) in its elemental state which is primarily relied upon for catalysis, yet during the heat-storage portion of the cycle, there is a strong tendency for the metal to be converted to its oxide which is relatively a poor catalyst. This is particularly true when excess air is employed which may be desirable to insure complete combustion during the heating period. In addition, if the catalyst is permitted to remain idle, it may gradually revert to the oxide form. While it may be expected that the hydrocarbon being reformed might itself act as a reducing agent to return the oxide to metallic form, it is found that they are poor and reluctant reducers so that there is little reducing action where the reactants first enter the catalyst bed.

This problem is recognized in said co-pending application Serial No. 124,648, and it is pointed out that in certain circumstances where the combustion products formed during the heating portion of the cycle are products of incomplete or partial combustion of the fuel, so as to be mixed with the products of the reformation step to alter certain characteristics, these partial combustion products, passing through the catalyst bed during the heating portion of the cycle tend to maintain the catalyst in a reduced condition. However, even products of incomplete combustion are not extremely active reducers, and since combustion efficiency is low where only partial combustion is employed, it is often desirable to employ complete combustion during the heating step, even to the extent of having excess air present.

The present process, in addition to eliminating the aforementioned difficulties and limitations, provides other improvements, among which are the recovering of sensible heat from heating gases and hot product gas and the regenerative use of this heat to preheat incoming reactants; and the levelling out of the cyclical temperature fluctuations over the entire system.

It is a principal objecet of the present invention to provide a cyclic process for the catalytic reformation of hydrocarbons in the gaseous state and steam into a gas rich in hydrogen and oxides of carbon, mainly carbon monoxide, useful as a component of a combustible gas and which, among other uses, can serve as a source of gas for distribution in city gas mains, which process presents improvements over the present reformation procedures.

A further object is to provide a cyclic process for the catalytic production of a gas of the type described wherein danger of thermally cracking the hydrocarbon reactant before it contacts the reforming catalyst is eliminated.

Another object is to provide a cyclic catalytic process of the type described wherein there is no procedural limitation on the vigor of combustion employed during the heat storage steps.

Another object is to provide a cyclic catalytic process of the type described in which is eliminated the danger of faulty ignition of the fuel during heating steps due to cooling through contact with process reactants coupled with limitations placed on the vigor of combustion during the heating steps.

Another object is to provide a process of the type described in which temperature fluctuations are reduced and thus wherein spalling of refractory material in the combustion chamber and heat storage zones is eliminated.

Still another object is to provide a cyclic catalytic process of the type described wherein sensible heat remaining in the heating gases and in the hot product gases is recovered and used to preheat reactants during the reforming steps.

Other objects, including the provision of a novel apparatus in which to carry out the present process, will be apparent from a consideration of the following specification and the claims.

The improved cyclic process of the present invention comprises, in one part of the cycle, burning a fluid fuel in a combustion chamber and passing the resulting hot products of combustion, in parallel through two confined paths, each of which comprises, in series, a zone of refractory heat storage material, a catalyst zone, and a second zone of refractory heat storage material, storing heat therein; in another part of the cycle, passing a hydrocarbon in the gaseous state and steam, and in the preferred embodiment air, in series, through each of said paths in one direction, recovering the resulting gas rich in hydrogen and oxides of carbon, mainly carbon monoxide; and in still another part of the cycle passing a hydrocarbon in the gaseous state and steam, and preferably also air, in series, through each of said paths in a direction opposite to the first said passage, and recovering the resulting gas rich in hydrogen and oxides of carbon, mainly carbon monoxide.

The operation of the present process may be more clearly understood from a consideration of the drawings in which:

Figure 1 shows diagrammatically an apparatus in which the process of the present invention may be carried out; and Figure 2 shows diagrammatically another form of apparatus in which the present process may be carried out.

In Figure 1, 1 represents a refractory-lined combustion chamber. 2 and 3 represents, respectively, refractory-lined chambers. Chambers 2 and 3 are in flow-communication with each other, and with combustion chamber 1 at their bases, and each contains a first heat storage zone, 4 and 5, respectively, supported as by fire brick arches 6 and 7, respectively; a catalyst zone, 8 and 9, respectively, supported as by arches 10 and 11, respectively; and a second heat storage zone, 12 and 13, respectively, supported as by arches 14 and 15, respectively. The heat storage zones consist of heat storage refractory bodies such as fire brick arranged in familiar checkerwork pattern as shown, or randomly arranged pieces of refractory material, or a combination of both.

Numerals 31 and 32 represent respectively the air and fluid fuel supply means for combustion to heat the apparatus, and 16 and 17 represent, respectively, the stack valves through which the waste heating gases may be discharged to the atmosphere, or to waste heat boilers (not shown) before being vented to the atmosphere. The entrance for the hydrocarbon reactant and steam for passage during a reforming run down through chamber 2 and up through chamber 3 are shown at 18 and 20, respectively. Likewise, the entrance for hydrocarbon reactant and steam for passage down through chamber 3 and up through chamber 2 are shown at 19 and 21, respectively. In accordance with the preferred practice of the invention, air is also employed during the reformation runs, and the entrances for air into each chamber depending upon the direction of flow are shown at 22 and 23, respectively. As will be discussed more in detail hereinafter, a portion of the process steam may be admitted into combustion chamber 1, and this supply means is shown at 24. Each of the conduits supplying the various materials is supplied with a suitable valve, as shown, to control the flow of materials.

26 represents the conduit through which product gas leaves chamber 2 for passage to storage by way of conduit 28, wash box 29, and conduit 30. Similarly, 27 represents the conduit through which the product gas leaves chamber 3 for storage, also passing through conduit 28, wash box 29, and conduit 30. Three-way valve 25 governs the flow of gases through conduits 26 and 27, respectively, into wash box 29. In accordance with known gas practice, the product gas may pass through a waste heat boiler (not shown) before reaching the wash box. Although a common wash box is shown, it will be understood that this is not critical and each chamber may have its own product-recovery system.

The operation, as stated, is cyclic and the process comprises first a heating or heat storage (or blasting) period during which air and a fluid fuel are admitted through connections 31 and 32, respectively, combustion taking place in combustion chamber 1. The hot combustion products are divided and part passed through chamber 2 and part passed through chamber 3. During this parallel flow, the hot combustion products pass, first through first heat storage zones 4 and 5, respectively, storing heat therein, then through catalyst zones 8 and 9, respectively, storing heat therein, then through second heat storage zones 12 and 13, respectively, storing heat therein, and thence out to the atmosphere through stack valves 16 and 17, respectively. After the set is heated to reacting temperature, the admission of fuel and air is terminated, stack valves 16 and 17 are closed, and hydrocarbon reactant and steam, and preferably also air, are passed in series through both paths first in one direction, and then, with or without an intervening heating period, in the other direction. For the sake of illustration, the reactants will be passed from left to right and then from right to left without an intervening heat storage portion although it will be realized that an additional heating period may be interposed between the first gas-making run and the second reverse gas-making run. Thus assuming that the set is at reaction temperature by virtue of the above-described heating step, and the stack valves closed, connections 18 and 20 are opened admitting hydrocarbon reactant and steam into chamber 2. At the same time, three-way valve is adjusted to permit fluid flow from conduit 27 to conduit 28 and the gas recovery system. If desired, and in accordance with the preferred embodiment, process air may be admitted by opening connection 22. The various gaseous materials pass first through the second heat storage zone (12) of chamber 2, becoming preheated; then through catalyst zone 8 where a portion of the gaseous reactants become converted to hydrogen and carbon monoxide; then through first heat storage zone 4 of chamber 2 and through first heat storage zone 5 of chamber 3, where the gaseous reactants are further heated; then through catalyst zone 9 where complete reformation takes place, and the resulting product gas rich in hydrogen and carbon monoxide passes through second heat storage zone (13) of chamber 3 where some of the sensible heat retaining by the gases is given up to the refractory materials. The product gas is then passed to storage by way of conduits 27 and 28, wash box 29, and conduit 30.

Connections 18 and 20, and 22 if process air was used, are then turned off, and connections 19 and 21 are opened to admit the hydrocarbon reactant and process steam to chamber 3. At the same time, three-way valve 25 is adjusted to permit fluid flow through conduit 26 to conduit 28 and the product gas-recovery system. If air is employed, it may be admitted through connection 23. The gaseous materials pass, in series, through heat storage zone 13, catalyst zone 9, heat storage zone 5, heat storage zone 4, catalyst zone 8, and heat storage zone 12; and, as described in connection with the first-described passage from left to right, the reactants become mixed, preheated, partially reformed, further heated, and completely reformed in that order, the resulting gas rich in hydrogen and carbon monoxide giving up sensible heat to heat storage zone 12. The product gas is led off to storage by way of conduits 26 and 28, wash box 29, and conduit 30. The cycle is then repeated by reheating the apparatus as described followed by the two gas-making runs, first in one direction then in the reverse direction.

Referring to Figure 2, that figure, as stated, illustrates another embodiment of the apparatus in which the present process may be practiced. The apparatus illustrated in Figure 2 is similar to that illustrated in Figure 1, except that in Figure 2 the combustion chamber precedes the two reaction chambers, whereas in Figure 1 the combustion chamber is located between the two reaction chambers. The process, however, in either case is the same. In Figure 2, 41 represents the refractory-lined combustion chamber. 42 and 43, respectively, represent the refractory-lined reaction chambers. Chambers 42 and 43 are in flow-communication at their bases with each other and with the combustion chamber. Each of the reaction chambers contain a first heat storage zone 44 and 45, respectively, supported as by fire-brick arches 46 and 47, respectively; a catalyst zone 48 and 49, respectively, supported as by fire-brick arches 50 and 51, respectively; and a second heat storage zone 52 and 53, respectively, supported as by fire-brick arches 54 and 55, respectively. The heat storage zones are as described in connection with Figure 1.

Numerals 71 and 72 represent respectively the air and fluid fuel supply means for combustion to heat the apparatus, and 56 and 57 represent, respectively, the stack valves through which the waste heating gases may be discharged to the atmosphere, or to waste heat boilers (not shown), before being vented to the atmospphere. The entrance for the hydrocarbon reactant and steam for passage during a reforming run down through chamber 42 and up through chamber 43 are shown at 58 and 60, respectively. Likewise, the entrance for hydrocarbon reactant and steam for passage down through chamber 43 and up through chamber 42 are shown at 59 and 61, respectively. As stated, in accordance with preferred practice, air is also employed during the reforming runs, in which case process air may be introduced through connection 62 or 63 depending upon the directions of flow of reaction gases. As in Figure 1, a portion of the process steam may be introduced to the combustion chamber, as through connection 64. Each of the conduits supplying the various materials is provided with a suitable valve, as shown, to control the flow of materials.

66 represents the conduit through which product gas leaves chamber 42 for passage to storage by way of conduit 68, wash box 69, and valved conduit 70. Similarly, 67 represents the conduit through which product gas leaves chamber 43 for passage to storage by way of conduit 68, wash box 69, and conduit 70. Three-way valve 65 controls the flow of gases through conduits 66 and 67, respectively, into wash box 69. As stated in connection with Figure 1, the product gas may pass through a waste heat boiler (not shown) before reaching the wash box in accordance with known gas practice. It will also be understood that separate product recovery systems may be employed, rather than the common system illustrated in the drawing.

The apparatus illustrated in Figure 2 may be conveniently prepared from a conventional carburetted water gas set. For example, the combustion chamber 41 may be the generator of a conventional water gas set with appropriate modification, as obvious, if a fluid fuel is to be employed. Chamber 42 may be a carburetter shell extended in height to that of the superheater shell which may be used as chamber 43. With the installation of heat storage zones and catalyst zones, and the repositioning and addition of certain fluid connections, as is clear from the drawing, the extended carburetter and the superheater of a water gas set can be converted to apparatus suitable for the practice of the invention.

The operation of the apparatus of Figure 2 is similar, as stated, as the operation of the apparatus of Figure 1. The process is cyclic and comprises first a heating step during which air and a fluid fuel are admitted through connections 71 and 72, respectively, combustion taking place in combustion chamber 41. The resulting hot products of combustion are taken off as two streams passing in parallel and simultaneously through chambers 42 and 43. During this parallel flow, the hot combustion gases pass first through first heat storage zones 44 and 45, respectively, storing heat therein; then through catalyst zones 48 and 49, respectively, storing heat therein; then through second heat storage zones 52 and 53, respectively, storing heat therein; and thence to the atmosphere through stack valves 56 and 57, respectively. After the set is heated to reacting temperature, the admission of fuel and air is terminated, stack valves 56 and 57 are closed, and a hydrocarbon in the gaseous state and steam, and preferably also air, are passed in series through both chambers, first in one direction, and then, with or without an intervening heating period, in the other direction. Since Figure 1 was described in terms of a gas-making run in one direction followed by a gas-making run in the opposite, or reverse, direction, without a heating period being interposed therebetween, Figure 2 will be described in connection with such a procedure but in which a heating period is interposed between the two gas-making runs. Thus, in beginning the first gas-making run of the cycle, the hydrocarbon reactant and steam are admitted, for example, through connections 59 and 61, respectively, for admission to chamber 43. Three-way valve 65 is adjusted to permit gas flow through conduit 66 to conduit 68 and the product recovery system. If air is to be employed, it may be admitted through conduit 63. The various gaseous materials pass first through second heat storage zone (53) of chamber 43 becoming preheated; then through catalyst zone 49 where they are partially converted to hydrogen and carbon monoxide; then through first heat storage zone 45 of chamber 43 and through first heat storage zone 44 of chamber 42 where they are further heated; then through catalyst zone 48 where complete reformation takes place; and the resulting product gas rich in hydrogen and carbon monoxide passes through second heat storage zone 52 of chamber 42 where some of its sensible heat is given up to the refractory material. The product gas is then passed to storage by way of conduits 66 and 68, wash box 69, and conduit 70.

Before the temperature of the apparatus falls to below reacting temperature, the described gas-making run is terminated, and the system reheated as described above. When sufficient heat is again stored in the apparatus, the second gas-making run of the cycle is begun, this time with flow of the reactants in a direction opposite to that of the first described gas-making run. Thus, with the adjustment of three-way valve 65 to permit gas flow through conduit 67 to conduit 68 and the product recovery system, the gaseous hydrocarbon and steam are admitted through conduits 58 and 60, respectively, to chamber 42. If air is employed, it is admitted through conduit 62. The various gaseous materials now pass in series first through second heat storage zone 52, catalyst zone 48, first heat storage zones 44 and 45, catalyst zone 49 and second heat storage zone 53, and, as described in connection with the first-described passage from right to left, the reactants become mixed and preheated, partially reformed, further heated and completely reformed, in that order, the resulting gas rich in hydrogen and carbon monoxide giving up sensible heat to heat storage zone 53. The product gas is led off to storage by way of conduits 67 and 68, wash box 69, and conduit 70. The cycle is then repeated by reheating the apparatus as described, performing a gas-making run in one direction, again reheating as described, and performing a gas-making run in the reverse direction.

In the catalyst beds, the following typical reactions take place (where natural gas is the gaseous hydrocarbon being reformed):

(1) With steam, $CH_4 + H_2O = 3H_2 + CO$
(2) With air, $CH_4 + \frac{1}{2}O_2 + 1.9N_2 = 2H_2 + CO + 1.9N_2$ It will be realized that in accordance with common gas-making practice steam purges may be, and preferably are, made between the heating and the gas-making portions of the cycle, or between the gas-making and heating portions of the cycle, or both. In addition, in a cycle where no heating step is interposed between the gas-making run in one direction and the gas-making run in the other, or reverse, direction, a steam purge may be employed between gas-making runs. These purges, as known to those familiar with the gas-making art, serve to clear the system of undesirable gases which may contaminate the generated gas or serve to force residual desirable gases to storage.

As stated previously in connection with the drawing, the apparatus may be provided with a connection for admitting a portion of the process steam to the combustion chamber during the gas-making portions of the cycle. This is to temper the unduly high temperatures which may result in the combustion chamber unless some of the heat is withdrawn therefrom, and which may result in the deterioration of the refractory lining of the combustion zone. Of course, the steam so admitted will be preheated in the combustion zone and may then mingle with the reactants passing in series through the reaction chambers. Likewise, a minor portion of the process air, if used, may be admitted as through the conduit through which air for combustion is admitted, thereby becoming preheated and preventing the temperature in the combustion chamber from becoming deleteriously high. Similarly, with proper control of the temperature in the combustion chamber, small amounts of hydrocarbon reactant may also be admitted to the combustion chamber during the gas-making portion of the cycle, thereby becoming preheated. In this case, care is taken to avoid thermal cracking of the hydrocarbon in the combustion zone. In the event a portion of the gas-making reactants are admitted to the combustion zone, it will be realized that it is for the purpose of preventing the temperature of the combustion zone from becoming deleteriously high, with the ancillary feature that any of the reactants so admitted become preheated therein, and reactants will not be admitted to the combustion zone to the extent that the temperature thereof falls below that at which satisfactory ignition of the fuel and combustion thereof during the heating portions of the cycle occurs.

The process of the present invention offers many important advantages in the catalytic reformation of hydrocarbons and steam into a gas of the type described. In the first place, since no more than a minor portion of any of the unheated reactants as such pass through the combustion zone, dangers of faulty ignition in the combustion chamber due to undue cooling by incoming reactants are eliminated. In addition, since the hydrocarbon reactant is admitted to the system at the extremities of the reaction chambers where mild temperatures are encountered, rather than at the combustion chamber, thermal cracking of the hydrocarbon before it contacts the catalyst bed is eliminated. Moreover, the disposition of a given mass of catalyst in two relatively thin zones rather than one thick zone provides more uniform heating on the blow period when heated in parallel; and on the run period, after the endothermic heat loss in the first zone, a provision for reheating is afforded before the partly reformed gases enter the second zone.

A primary feature of the present process is the maintenance of the catalyst zones in a state of optimum activity. The reformed product gas, being rich in hydrogen and carbon monoxide, has been found to be highly reducing with respect to the oxide of the catalyst metal. In a uni-directional process, the reactants, during each and every cycle, pass only in one direction through the catalyst zone. In this case, only the latter or exit portion of the catalyst zone is contacted with a gas rich in hydrogen and carbon monoxide, and thus it is only the exit portion of the catalyst zone which is maintained in a high state of activity. It will be noted that by the present process, not only are the reformed products leaving each catalyst zone passed completely through the other catalyst zone during each cycle, but that also, during each cycle, the reactants pass through each catalyst zone in both directions. Both of these features result in the contact of all portions of each catalyst zone with the highly reducing product gas during each cycle.

Catalysts for the endothermic reaction of hydrocarbons with steam to produce gas mixtures comprising free hydrogen and carbon monoxide, together with variable proportions of carbon dioxide, are well known. The catalysts most frequently proposed for this purpose are metals of the iron group, with nickel and cobalt catalysts usually preferred, although other high melting metals such as vanadium, chromium, platinum, and the like have been used. As between nickel and cobalt, the nickel catalysts have usually been used because the reaction is easier to control and the nickel catalysts are less expensive.

A suitable refractory carrier is frequently employed, on the surface of which the catalytic material is disposed or throughout which it is distributed. Difficulty reducible oxides such as alumina, silica, magnesia, calcium oxide, titanium oxide, chromium oxide, oxides of rare earth metals such as, for example, thoria, ceria, and/or others may be present. Compounds such as chromates may be employed.

One method of catalyst preparation involves the precipitation of the catalyst in the form of a salt upon finely divided carrier material, calcination to produce the oxide of the catalyst metal, pelleting or the making of extruded shapes from a paste of the calcined material, and reduction of the oxide at elevated temperature to the metallic catalyst, either as a step in the preparation of the catalyst or after it has been placed in the gas-treating equipment. In the preparation of another type of catalyst, preformed refractory bodies, such as alundum balls, and the like are impregnated with a salt of the catalytic metal and thereafter the impregnated shapes are calcined to form the oxide of the metal which is subsequently reduced. The catalyst employed may be produced by any desired procedure which forms no part of this invention.

The hydrocarbon material reformed in the gas-generating portion of the cycle may comprise normally gaseous hydrocarbon material such, for example, as methane, ethane and propane, or vaporizable liquid hydrocarbons such as butane and heavier hydrocarbon distillates. Corresponding unsaturated hydrocarbons may be present in any desired concentration, such, for example, as ethylene, propylene, butylene, etc. The normally gaseous hydrocarbons are preferred for use. Natural gas, which is primarily methane and refinery oil gas, which comprises primarily methane, ethylene and heavier hydrocarbons are among the hydrocarbon materials which may be employed. Natural gas, because of its availability is particularly preferred as the hydrocarbon reactant.

With respect to the fuel employed during the heat-storage period of the cycle, the foregoing discussion has dealt primarily with the use of a fluid—that is gaseous or liquid—combustible, since fluid fuels are preferred. However, it will be realized that solid fuel, such as coal, coke, and the like, may be employed, in which case a bed of the fuel is maintained in the combustion chamber and blasted with air during the heating step or steps of the cycle in accordance with known producer gas practice. Or one gas producer could heat two sets alternately if synchronized. Gaseous hydrocarbons, such as those mentioned above, and especptially natural gas, are particularly satisfactory, although gaseous fuel not rich in hydrocarbons, such as water gas, producer gas, and the like may also be used. Liquid hydrocarbons, such as fuel oil, gas oil, gasoline, kerosene, tar, and the like may be employed if desired. In the event a liquid fuel is employed, conventional spraying or other vaporizing means may be utilized to facilitate combustion.

The proportions of process steam to hydrocarbon reactant employed during the reforming portion of the cycle generally run between about .8 mol and about 5 mols, and preferably between about 1.5 and about 2.5 mols, of steam for each mol of carbon in the hydrocarbon reactant. When air is employed during the reforming portion of the cycle, the proportion of steam to hydrocarbon required may be descreased in which case as low as about .8 mol of steam per mol of carbon in the hydrocarbon reactant may be employed.

As stated, in accordance with the preferred embodiment of the process, some air is employed during the reforming portion of the cycle. The amount of air so employed will be less than about 2 mols thereof per mol of carbon in the hydrocarbon reactant and in most cases will be less than about 1 mol thereof per mol of carbon in the reactant. Preferably, the amount of air employed during the reforming portion of the cycle is between about .1 and about .6 mol thereof per mol of carbon in the hydrocarbon reactant.

Referring to the temperature conditions employed during the cycle, the reactants, as stated, are heated, preferably to reacting temperatures, at least by the time they have passed through the heat storage zones preceding the second catalyst zone in their path and before they pass through the second catalyst zone. The main considerations, therefore, are that the hydrocarbon reactant, while being heated sufficiently to effect substantially complete reaction thereof in the catalyst zone, is not heated, during its passage through the heat storage zones, to a point where significant thermal cracking thereof takes place with formation of any significant quantity of carbon. The exact temperature conditions governing these considerations will depend in part upon the particular gaseous hydrocarbon reactant employed. It has been found, for example, that, when reforming natural gas, the average temperature of the heat storage material should not exceed about 2000° F., nor should it fall below about 1400° F. in the first heat storage zones of each chamber. In other words, the heat storage material in the first heat storage zones of each chamber will have an average temperature at the beginning of the reforming portion of the cycle of not over about 2000° F., and, at the end of the reforming portion of the cycle, of not less than about 1400° F. The average temperature of the second heat storage zone in each chamber will be somewhat lower than those mentioned above due to their distance from the combustion chamber and to the cooling effect of the incoming reactants. Because of the direction of flow of the hot combustion gases during the heat storage portion of the cycle, first through the first heat storage zones of each chamber, then through the catalyst zone, and finally through the second heat storage zone of each chamber, the temperature of the catalyst and of the second heat storage zones, as stated, at any one time, will normally be somewhat less than the average temperature of the first heat storage zones, and generally the temperatures in the catalyst zones, at the beginning of the reforming run, when reforming natural gas and referring to the above temperature ranges, will not exceed about 1800° F. at the hot end and may be as low as about 1300° F. at the cold end.

When reforming hydrocarbons heavier than methane, it may be desirable to employ somewhat lower temperatures in the heat storage beds in order to avoid thermal cracking and since the reformation of hydrocarbons heavier than methane, may not require temperatures as high as when methane is reformed. Thus, when reforming hydrocarbons heavier than methane, temperatures as low as about 1000° F. may be employed in the heat storage zones, depending upon requirements.

Referring more particularly to the heat storage portion of the cycle, it may be conducted by burning the fuel with excess air, with insufficient air to support complete combustion, or with just the amount theoretically required for complete combustion, so long as the heat storage zones and catalyst zones are raised to the required temperatures. While in the present process it is not necessary to employ partial combustion during the heat storage portion of the cycle in order to maintain the catalyst in the state of optimum activity, such procedure is not excluded and in fact it may at times be desirable to conduct at least a part, such as the latter part, of the heating portion or portions of the cycle by burning the fuel with insufficient air to support complete combustion, thereby producing combustion products substantially devoid of free oxygen and having a substantial content of hydrogen and carbon monoxide in addition to their content of carbon dioxide, water vapor, and nitrogen. In this type of operation, it is also advantageous to conduct the first part of the heat storage portion of the cycle by burning fuel in the presence of air in excess of that required for complete combustion. The excess air also insures that any carbon accidentally deposited during the reforming portion of the cycle will be removed. As will be pointed out in detail hereinafter, the above-mentioned products of incomplete combustion may be mixed in controlled amount with the product gas generated during the reforming portions of the cycle in order to modify its characteristics.

Referring to the gas produced during the reforming portions of the cycle it will chiefly comprise hydrogen and carbon monoxide with small but varying amounts of gaseous hydrocarbons and carbon dioxide and with varying amounts of nitrogen depending upon the amount of air employed during the reforming portions of the cycle. While this gas is combustible, and has many uses, such as synthesis gas, it does not possess the characteristics which would make it usable per se as city gas. For instance, its calorific value will be lower than that required for utilization in city gas distribution systems. Thus if the gas produced during the reforming portions of the cycle is to be distributed as city gas it must be enriched with gas having a calorific value higher than that desired in the mixed gas. Such enriching gas may be any of the gaseous hydrocarbons mentioned above and particularly natural gas.

In many cases, however, the mere enrichment of the gas produced during the reforming portions of the present process with a gas of higher calorific value does not provide a mixed gas possessing all the characteristics required in a particular area. For instance, while a mixed gas possessing the desired calorific value may be obtained by mixing, for example, natural gas with the gas produced during the reforming portions of the present process, the specific gravity of the mixed gas may still be below, and/or the ratio of hydrogen to inerts above, the specifications in a particular area. Or, because of its availability in a particular area, it may be desirable to utilize coke oven gas as part of the distributed gas. Since coke oven gas is relatively rich in hydrogen, its admixture with the gas produced during the reforming portions of the present process, which is also rich in hydrogen, would result in a ratio of hydrogen to inerts well above that required.

For these reasons, it is often desirable to also mix with the gas produced during the reforming portions of the process a controlled quantity of a gas possessing a high specific gravity and a low ratio of hydrogen to inerts. Such a gas may be produced by the combustion of a hydrocarbon, preferably in the presence of insufficient air to support complete combustion. An especially advantageous gas in this regard is the product of incomplete combustion produced during the above-described heat storage stage in which a fluid hydrocarbon fuel is burned in the presence of insufficient air to support complete combustion.

The exact proportions of enriching gas, and products of combustion if used, and coke oven gas if used, mixed with the gas produced during the reforming portions of the cycle to provide a finished gas suitable for distribution as city gas are subject to variation, depending not only upon the specifications to be met, but also upon the exact characteristics of the enriching gas, and of the gas produced during the reforming portion of the cycle, and also of the products of combustion and coke oven gas if used. Generally manufactured city gases have a calorific value of between about 520 and about 570 B. t. u., a specific gravity of between about .45 and about .75 and a ratio of hydrogen to inerts of from about 1 to 1 up to about 6 to 1. On the other hand, the gas produced during the reforming portions of the cycle will have a calorific value lower than that recited above, for example, around 300 B. t. u., a specific gravity within or somewhat below (for example .35) the range recited above, and a ratio of hydrogen to inerts within or somewhat above (for example, 10 to 1) the range set forth above. The enriching gas will have a calorific value well above that required, natural gas having a heating value around 1050 B. t. u., a specific gravity around .61–.63, and a hydrogen to inerts ratio of zero, since it is usually free of hydrogen. The product of incomplete combustion will have a calorific value well below the above-recited range and may even be less than 100 B. t. u.; its specific gravity will be above the recited range often being around 1, and its hydrogen to inerts ratio will be well below the recited range.

It will be seen that although the proportions of the various gases that are to be mixed may vary widely, the determination of the exact proportions needed in any particular case will offer no difficulty to those familiar with the gas-making art, and can be arrived at by simple calculation. By varying the proportions of reactants, namely gaseous hydrocarbon and steam, or gaseous hydrocarbon, steam, and air, used during the reforming portions of the cycle, the various characteristics of the resulting gas can be controlled as desired. In addition to these variables, by varying the amount of products of combustion, such as the products of incomplete combustion formed during the heat-storage portion or portions of the cycle, which may be mixed with the gas produced during the reforming periods, further control of the characteristics of resulting mixed gas is afforded. In any event, it will be seen that the present process offers wide flexibility to produce gas interchangeable with any manufactured city gas, or suitable for admixture with other gases, to meet changing situations encountered in the city gas industry.

Considerable modification is possible in the selection of the gaseous hydrocarbon reactant, fuel gas, and blending gases, as well as in the proportions of reactants and blended gases, and the apparatus may be modified in various ways, without departing from the scope of the invention.

I claim:

1. The cyclic process for the manufacture of a gas rich in hydrogen and oxides of carbon, mainly carbon monoxide, which comprises the following steps carried out in sequence: burning a fuel in a combustion chamber, dividing the resulting hot combustion products into two streams and passing the two streams simultaneously and in parallel through separate paths each of which paths comprises a first heat storage zone of refractory material, a zone of reforming catalyst and a second heat storage zone of refractory material, in the stated order, to store heat therein; discontinuing said flow of combustion products;

passing a hydrocarbon in the gaseous state and steam through both paths first through one and then through the other from the exit end of one with respect to the flow of combustion products to the exit end of the other without passing through said combustion chamber, forming a gas rich in hydrogen and oxides of carbon, mainly carbon monoxide, whereby the catalyst zone in the path last traversed is contacted with a reducing gas rich in hydrogen and carbon monoxide; removing said gas from the paths; discontinuing said flow of hydrocarbon and steam; passing a hydrocarbon in the gaseous state and steam through both paths in a direction opposite to said first mentioned passage of hydrocarbon and steam, first through one path and then through the other from the exit end of one with respect to the flow of combustion products to the exit end of the other, without passing through said combustion chamber, forming a gas rich in hydrogen and oxides of carbon, mainly carbon monoxide, whereby the catalyst in the path last traversed is contacted with a reducing gas rich in hydrogen and carbon monoxide; removing said gas from the paths, and discontinuing said flow of hydrocarbon and steam.

2. The process of claim 1 wherein air is admixed with said hydrocarbon and steam during each of said passages thereof through said paths.

3. The cyclic process for the manufacture of a gas rich in hydrogen and oxides of carbon, mainly carbon monoxide, which comprises the following steps carried out in sequence: burning a fluid fuel in a combustion chamber, dividing the resulting hot combustion products into two streams and passing the two streams simultaneously and in parallel through separate paths each of which paths comprises a first heat storage zone of refractory material, a zone of reforming catalyst and a second heat storage zone of refractory material, in the stated order, to store heat therein; discontinuing said flow of said hot combustion product; passing a hydrocarbon in the gaseous state and steam through both paths first from the exit end of one with respect to the flow of combustion products to the exit end of the other, without passing through said combustion chamber, forming a gas rich in hydrogen and oxides of carbon, mainly carbon monoxide, whereby the catalyst zone in the path last traversed is contacted with reducing gas rich in hydrogen and carbon monoxide; removing said gas from said path; discontinuing said flow of hydrocarbon and steam; burning a fluid fuel in said combustion chamber, dividing the resulting hot combustion products into two streams and passing the two streams simultaneously and in parallel through said separate paths to store heat therein; discontinuing said flow of hot combustion products; passing a hydrocarbon in the gaseous state and steam through both paths in a direction opposite to said first mentioned passage of hydrocarbon and steam, first through one path and then through the other, from the exit end of one with respect to the flow of combustion products to the exit end of the other, without passing through said combustion chamber, forming a gas rich in hydrogen and oxides of carbon, mainly carbon monoxide, whereby the catalyst zone in the path last traversed is contacted with reducing gas rich in hydrogen and carbon monoxide; removing said gas from said path, and discontinuing said flow of hydrocarbon and steam.

4. The process of claim 3 wherein air is admixed with said hydrocarbon and steam during each passage thereof.

5. The cyclic process for the manufacture of a gas rich in hydrogen and oxides of carbon, mainly carbon monoxide, which comprises the following steps carried out in sequence: burning a fuel in a combustion chamber, dividing the resulting hot combustion products into two streams and passing the two streams simultaneously and in parallel through separate paths each of which paths comprises a zone of reforming catalyst and a heat storage zone of refractory material, in the stated order, to store heat therein; discontinuing said flow of combustion products; passing a hydrocarbon in the gaseous state and steam through both paths first through one and then through the other from the exit end of one with respect to the flow of combustion products to the exit end of the other, forming a gas rich in hydrogen and oxide of carbon, mainly carbon monoxide, whereby the catalyst zone in the path last traversed is contacted with a reducing gas rich in hydrogen and carbon monoxide; removing said gas from the paths; discontinuing said flow of hydrocarbon and steam; passing a hydrocarbon in the gaseous state and steam through both paths in a direction opposite to said first mentioned passage of hydrocarbon and steam, first through one path and then through the other from the exit end of one with respect to the flow of combustion products to the exit end of the other, forming a gas rich in hydrogen and oxides of carbon, mainly carbon monoxide, whereby the catalyst in the path last traversed is contacted with a reducing gas rich in hydrogen and carbon monoxide; removing said gas from the paths, discontinuing said flow of hydrocarbon and steam.

References Cited in the file of this patent

UNITED STATES PATENTS

| Number | Name | Date |
|---|---|---|
| 543,992 | Kirkham | Aug. 6, 1895 |
| 1,540,541 | Calvin | June 2, 1925 |
| 1,843,063 | Burke | Jan. 26, 1932 |
| 1,929,665 | Wilcox | Oct. 10, 1933 |
| 2,071,286 | Johnson et al. | Feb. 16, 1937 |
| 2,192,815 | Johnson et al. | Mar. 5, 1940 |
| 2,205,554 | Brandegee | June 25, 1940 |
| 2,208,123 | Duncan | July 16, 1940 |
| 2,230,467 | Nelly et al. | Feb. 4, 1941 |
| 2,361,584 | Allen | Oct. 31, 1944 |
| 2,363,716 | Wolk | Nov. 28, 1944 |